(12) United States Patent
Zhang et al.

(10) Patent No.: US 11,464,253 B2
(45) Date of Patent: Oct. 11, 2022

(54) SINGLE NOZZLE 3D PRINTING METHOD FOR NON-HOMOGENEOUS RECOMBINANT FOOD CONTAINING CRUSHED ROSE FLOWERS

(71) Applicants: JIANGNAN UNIVERSITY, Jiangsu (CN); SHANDONG HUAMEI BIOTECHNOLOGY LIMITED COMPANY, Shandong (CN)

(72) Inventors: Min Zhang, Jiangsu (CN); Chunyan Feng, Jiangsu (CN); Bin Wang, Jiangsu (CN)

(73) Assignees: JIANGNAN UNIVERSITY, Jiangsu (CN); SHANDONG HUAMEI BIOTECHNOLOGY LIMITED COMPANY, Shandong (CN)

( * ) Notice: Subject to any disclaimer, the term of this patent is extended or adjusted under 35 U.S.C. 154(b) by 0 days.

(21) Appl. No.: 17/422,206

(22) PCT Filed: Dec. 6, 2019

(86) PCT No.: PCT/CN2019/123525
§ 371 (c)(1),
(2) Date: Jul. 12, 2021

(87) PCT Pub. No.: WO2020/177427
PCT Pub. Date: Sep. 10, 2020

(65) Prior Publication Data
US 2022/0079208 A1    Mar. 17, 2022

(30) Foreign Application Priority Data
Mar. 1, 2019 (CN) .......................... 201910156965.2

(51) Int. Cl.
A23P 30/00    (2016.01)
A23P 30/25    (2016.01)
B33Y 10/00    (2015.01)
B33Y 70/00    (2020.01)

(52) U.S. Cl.
CPC ............. *A23P 30/25* (2016.08); *B33Y 10/00* (2014.12); *B33Y 70/00* (2014.12)

(58) Field of Classification Search
CPC ................................. A23P 30/00; A23P 30/20
See application file for complete search history.

(56) References Cited

U.S. PATENT DOCUMENTS

| | | | |
|---|---|---|---|
| 7,842,320 B2 * | 11/2010 | Baydo | C09D 11/30 426/250 |
| 9,113,647 B2 * | 8/2015 | Liniger | B05B 15/68 |
| 2005/0157148 A1 * | 7/2005 | Baker | A23G 3/0097 347/106 |
| 2014/0093619 A1 | 4/2014 | Chang | |

FOREIGN PATENT DOCUMENTS

| | | |
|---|---|---|
| CN | 104365954 | 2/2015 |
| CN | 104687222 | 6/2015 |
| CN | 104938739 | 9/2015 |
| CN | 106213154 | 12/2016 |
| CN | 106259599 | 1/2017 |
| CN | 106578317 | 4/2017 |
| CN | 106720897 | 5/2017 |
| CN | 106798263 | 6/2017 |
| CN | 106805280 | 6/2017 |
| CN | 108294257 | 7/2018 |
| CN | 108477545 | 9/2018 |
| CN | 108740284 | 11/2018 |
| CN | 109169788 | 1/2019 |
| CN | 109198650 | 1/2019 |
| CN | 109700063 | 5/2019 |
| WO | 2016150960 | 9/2016 |
| WO | 2018226217 | 12/2018 |

OTHER PUBLICATIONS

G.G.CAKRAFT, How to Make White Bean Paste, Nov. 17, 2018, YouTube [online][video]. Retrieved from <youtube.com/watch?v=jxfcTeHwBO0> (Year: 2018).*
Veena Azmanov, Korean Bean Paste Buttercream for Piping Flowers, Feb. 19, 2020. Retrieved from <https://cakedecoratingtutorials.com/bean-paste-buttercream/> (Year: 2020).*
"International Search Report (Form PCT/ISA/210) of PCT/CN2019/123525," dated Mar. 4, 2020, with English translation thereof, pp. 1-6.

* cited by examiner

Primary Examiner — Monica A Huson
Assistant Examiner — Kelsey C Grace
(74) Attorney, Agent, or Firm — JCIP Global Inc.

(57) ABSTRACT

A single nozzle 3D printing method for non-homogeneous recombinant food containing crushed rose flowers, the method comprising: first washing white kidney beans, soaking in cold water for 12 h, and then peeling; boiling for 40 min to soften the white kidney beans; then mixing a beaten paste thereof with white sugar and simmering slowly over a low heat until the bean paste is viscous; allowing the bean paste to cool to room temperature and then adding butter, fine granulated sugar, and whipped cream, and beating; and finally adding different amounts and different sizes of crushed rose flowers having undergone surface oil treatment.

10 Claims, No Drawings

SINGLE NOZZLE 3D PRINTING METHOD FOR NON-HOMOGENEOUS RECOMBINANT FOOD CONTAINING CRUSHED ROSE FLOWERS

CROSS-REFERENCE TO RELATED APPLICATION

This application is a 371 of international application of PCT application serial no. PCT/CN2019/123525, filed on Dec. 6, 2019, which claims the priority benefit of China application no. 201910156965.2, filed on Mar. 1, 2019. The entirety of each of the above mentioned patent applications is hereby incorporated by reference herein and made a part of this specification.

BACKGROUND

Technical Field

The present invention relates to a single nozzle 3D printing method for non-homogeneous recombinant food containing crushed rose flowers, which relates to the food processing technology, and belongs to the field of novel food processing.

Description of Related Art

Three-dimensional printing technology is a modern intelligent manufacturing mode characterized by the high integration of manufacturing technologies and information technologies, and is a molding manufacturing technology in which special functional materials such as metals, plastics, cells and food materials are stacked and solidified layer by layer through software and numerical control systems. The three-dimensional printing technology provides a new idea different from traditional manufacturing technologies for the development of the food processing industry in China. Compared with traditional food manufacturing modes, the three-dimensional food printing technology has significant advantages of: (1) customizing personalized and nutritive food, and printing suitable nutritional products according to the specific nutritional needs of different populations, for example, a PERFORMANCE project funded by the European Union, which aims at printing a product suitable for consumption by the elderly; (2) expanding the sources of edible food materials; (3) simplifying supply chains; and (4) customizing the exquisite shape of food.

Zhang Min, et al. (2017) invents a regulation and control method for 3D printing and precision molding of instant conditioned mashed potatoes (CN106805280A). In the invention, potatoes are washed and peeled, and then cut into slices, the potato slices are boiled and then beaten until a delicate and shiny paste is obtained, a colloid is added thereto and uniformly mixed, and then the mixture is boiled, so that the potatoes are cooked and the colloid is fully dissolved. And process parameters such as nozzle diameter, printing distance, printing temperature, nozzle moving speed, discharging speed, and the like are improved to realize the fine printing of conditioned mashed potatoes. In this invention, the mashed potatoes as raw materials are a homogeneous system and the particle size of the material particles is measured by using a laser particle size analyzer to be between 205 μm and 245 μm, while the diameter of rose flowers as one of raw materials in the present invention is between 0.2 cm and 1.2 cm.

Huang Haihu, et al. (2015) invents a 3D printing method for non-dairy cream (CN104687222A). In this invention, a cooling system can implement the fixation and molding of non-dairy cream well. Molecules of the non-dairy cream can be broken and refined by means of ultrasonic treatment so as to prevent the occurrence of a phenomenon of nozzle clogging caused by non-uniform mixing, thereby improving the printing effect of a 3D printing system well. The main research of this invention is the printing of uniformly mixed non-dairy cream, which is obviously different from the non-homogeneous recombinant 3D printing method for crushed rose flowers originally seen as scraps disclosed by the present invention.

Zhang Min, et al. (2016) invents a method for improving the molding and 3D precision printing performance of a high-fiber dough system by adding functional sugar (CN106259599A), in which the raw materials mainly include 100 g of aged flour, 80-120 g of concentrated asparagus pulp, 10-30 g of butter and 10-30 g of functional sugar. The 3D printing material is edible, mainly composed of carbohydrates, and rich in dietary fibers, thereby providing energy for people. However, old stalks of asparagus, one of raw materials of the invention, require pre-processing such as beating and concentrating and the like, which increases the complexity and tediousness of the raw material processing procedure. In contrast, rose flowers, one of raw materials of the present invention, can be applied to printing without the need of complicated pre-processing.

Zhao Wanyi, et al. (2014) invents a 3D printing production method for a multi-flavor sandwich food (CN104365954A). According to the process, a food with a multi-flavor spatial sandwich structure is produced by using a 3D printing method. In the production process, different food base materials and sandwich materials are contained in a plurality of 3D printing heads, the base materials and the sandwich materials can be printed into products which are different in shape and quantity according to design requirements, and the sandwich materials can be completely wrapped inside the base materials. The invention improves the shortcoming that traditional sandwich foods are simplex in sandwich structure, and realizes a special taste, and meets the demands of people on diverse senses of taste. This invention describes the printing performance under the condition of multi-nozzle printing, which is different from the printing performance under the condition of single nozzle printing that has been studied in the present invention.

Zhang Min, et al. (2018) invents a method for improving the 3D printing effect by the reprocessing and post-processing of concentrated fruit pulps (CN108294257A). In the method, a prepared concentrated fruit pulp gel is added into a hopper of a 3D printer, 3D printing parameters corresponding to a model and system of the 3D printer are selected to perform 3D printing, moderate edge trimming is carried out on a printed product according to a target shape, and finally, surface coating and rapid freezing are performed on the printed product. The invention focuses on the processing mode of post-printed products, which is different from the present invention that focuses on adjusting printing parameters to improve the fineness of printed products.

Zhang Yunju, et al. (2016) invents a 3D ice cream printing method and a product thereof (CN106578317A). The inventors design a 3D ice cream printer which includes driving devices respectively in X, Y and Z directions, a material spraying system, a master control device and a protective hood, and the printer can solve the problems of long time consumption and high cost in existing 3D food printing, and is reasonable in structure design and novel in technology. This invention focuses on the performance and development of a machine, which is obviously different from the present invention that focuses on researches on printable heterogeneous food materials.

Zhang Min, et al. (2018) invents a 3D precision printing method for easy-to-swallow two-color mashed potato/mashed purple potato cold dishes (CN108477545A). In the invention, firstly, daily edible potatoes and purple potatoes are washed and peeled, and then cut into slices, boiled and beaten, and then a compounded system of xanthan gum and pectin is added; and by means of a two-nozzle printer, by determining the relative positions of two nozzles and by determining a filling ratio and a filling mode in printing, the mashed potatoes and the mashed purple potatoes are printed and molded using a two-color 3D printing model. The invention is implemented mainly by the two-nozzle printer, which is different from the present invention that uses the single nozzle printing technology.

Wei Honghui, et al. (2015) invents a candy paste applicable to 3D printing and a preparation method thereof (CN 104938739A). The candy syrup comprises the following components in percentage by weight: 50-85% of glucose, 0.5-5% of cellulose, 6-10% of xylitol, 3-5% of maltodextrin, and other various adjuvants. Cellulose contained in the paste can enhance the thermal stability of candy in storage, and act to stabilize the viscosity of the candy paste. A small amount of xylitol can increase the fluidity of the candy paste, so that smooth discharging can be realized in the printing process. The invention mainly describes the formula composition of a candy material for printing, while the present invention is directed to a non-homogeneous recombinant 3D printing method for crushed rose flowers originally seen as scraps.

Zhang Min, et al. (2017) invents a regulation and control method for improving the molding and 3D precision printing performance of a thawed surimi system (CN106798263A). According to the invention, through the combination of flaxseeds and gluconolactone acid, a surimi gel is induced to have stable viscosity and fluidity, so that when the surimi gel prepared by the process is used in 3D printing, the discharging speed and the three-dimensional molding rate can be improved, and the discharging is smooth, clogging is not easy to occur, and the printing accuracy is high. The invention mainly describes adding adjuvants to change the properties of materials, while the present invention focuses on exploring the influence of soft food materials with irregular shapes when being used in 3D printing.

Zhang Yun, et al. (2016) invents a 3D printing material of longan and rice flour and a processing method thereof (CN106213154A). The raw material formula of the 3D printing material are: 60-70 parts of rice flour, 5-8 parts of a longan extract, 8-10 parts of water, 8-10 parts of fresh milk, 8-10 parts of buckwheat flour, 3-5 parts of vegetable oil, 2-3 parts of honey, 2-3 parts of xylitol, 2-3 parts of table salt, 2-3 parts of maltodextrin, 2-3 parts of a dietary fiber, 1-2 parts of an emulsifier, and 0.1-0.2 part of an essence. Longan contains a large amount of trace elements beneficial to human health, which enriches the types of 3D printing food materials. The invention mainly describes the formula composition of a candy material for printing, while the present invention, after the optimal printing material is determined, further specifically determines the optimal printing parameters, which improves the printing accuracy.

Zhang Min, et al. (2017) invents a method for preparing a mochi-conditioned ice cream by improving the 3D printing precision molding of mochi (CN106720897A). The invention mainly studies the improvement of 3D precision printing performance by changing the size of a printing nozzle and refining the texture of a material by means of high-speed homogenization in the preparation process. In the present invention, the accuracy of 3D printing is improved mainly by adjusting process parameters.

SUMMARY

Technical Problem

The objective of the present invention is to provide a 3D printing method for non-homogeneous recombinant food from crushed rose flowers originally seen as scraps. In the method, crushed rose flowers are added into white bean paste, so that the taste of the white bean paste is improved, and the successful printing of rose flowers also promotes the development of food printing, and provides a certain theoretical basis for the printing of more food materials with large particle sizes and irregular shapes in the future. By adjusting different printing parameters such as nozzle diameter, nozzle moving speed, and discharging speed, etc., the optimal printing conditions are achieved, high-precision printed objects are obtained, and at the same time, some reference is also provided for other researchers to achieve precision printing.

Technical Solution

A single nozzle 3D printing method for non-homogeneous recombinant food containing crushed rose flowers, includes: first washing white kidney beans, soaking in cold water for 12 h, and then peeling; boiling for 40 min to soften the white kidney beans; then mixing a beaten paste thereof with white sugar and simmering slowly over a low heat until the bean paste is viscous; allowing the bean paste to cool to room temperature and then adding butter, fine granulated sugar, and whipped cream, and beating; and finally adding different amounts and different sizes of crushed rose flowers having undergone surface oil treatment. In order to enable the refined printing of crushed rose flowers originally seen as scraps, the printing nozzle diameter, the nozzle moving speed and the discharging speed are selected for the printing. The structure of a printed object does not collapse within 40-60 min. The specific steps of the method are as follows:

(1) pre-processing of white kidney beans: the white kidney beans are washed, soaked in cold water, and then peeled, and the peeled white kidney beans are boiled for 40 min until the white kidney beans are softened.

(2) beating: the white kidney beans boiled in the step (1) are beaten for three times by using a beating machine until a delicate paste is obtained.

(3) preparation of white bean paste: the white kidney bean paste obtained in the step (2) is mixed with white granulated sugar, the obtained mixture is simmered slowly over a low heat until the white bean paste is viscous, and in the shape of an inverted triangle while being lifted up by using a scraper, and the white bean paste is allowed to cool to room temperature, and then butter, fine granulated sugar, and whipped cream are added thereto and beaten.

(4) preparation of an aqueous solution of edible glycerin: 20 ml of edible glycerin is mixed with 100 ml of water so as to prepare a 20% aqueous glycerin solution, which is stored in a 4° C. refrigerator.

(5) pre-processing of crushed rose flowers: complete rose flower petals are processed into the following three sizes: a. 0.5-1.2 cm in length and 0.5-1.2 cm in width; b. 0.2-0.5 cm in length and 0.2-0.5 cm in width; and c. less than 0.2 cm in length and less than 0.2 cm in width; and the processed crushed rose flowers are soaked in the aqueous solution of edible glycerin prepared in advance in the step (4) for 30 min, where the surface oil treatment is designed to make it easier to squeeze the rose flowers from a fine nozzle.

(6) addition of crushed rose flowers: after the white bean paste obtained in the step (3) is cooled to room temperature, the crushed rose flowers soaked in the step (5) are added thereto so as to obtain a mixed material of the bean paste and the rose flowers, where the amount of the crushed rose flowers added is 1-3% by mass of the white bean paste obtained in the step (3). The rose flower is an edible plant food material of which petals are soft, and easy to change in self shape under the action of an external force, and will basically restore in shape after the external force is removed. Rose flowers contain a large amount of nutrients, and crushed rose flowers originally seen as scrap are turned from waste into a treasure, realizing the rational utilization of food resources. In addition, the addition of the rose flowers also brings a unique rose flavor to products.

a. determination of sizes of crushed rose flowers: after the bean paste is cooled to room temperature, 1% of crushed rose flowers with the three different sizes are respectively added.

b. determination of amount of crushed rose flowers: after the bean paste is cooled, 1-3% of the processed crushed rose flowers which are less than 0.2 cm in width and length are respectively added.

(7) 3D printing: 3D printing is performed on the mixed material of the white bean paste and the rose flowers obtained in the step (6), where the printing temperature is 25° C., the nozzle diameter is 1.2 mm, the nozzle moving speed is 10-15 mm/s, and the discharging speed is 20-22 $mm^3/s$.

a. determination of nozzle diameter: in an experiment, the molding characteristics of objects printed from printing materials added with crushed rose flowers with different sizes under the conditions that the nozzle diameters are respectively 0.84 mm, 1.2 mm and 1.5 mm are researched. The nozzle diameter affects the discharging situations of rose flowers with different sizes. When the nozzle diameter is 0.84 mm, it is difficult to discharge the material, and a phenomenon of line fracture will occur even when rose flowers with the smallest size are printed; when the nozzle diameter is 1.2 mm, it is easy to discharge the material, and the phenomenon of line fracture will occur only when rose flower petals with the largest size are printed; and when the nozzle diameter is 1.5 mm, it is easy to discharge the material when three sizes of rose flowers are printed, but compared with products printed by using the 1.2 mm nozzle, discharged lines are thicker, the surfaces of printed objects are rough, and the printing accuracy is poor. Therefore, when the nozzle with a diameter of 1.2 mm is selected to print rose flowers, the discharging continuity can be guaranteed and the precision printing can be achieved.

b. determination of nozzle moving speed: the fineness of a printed object is related to the nozzle moving speed. When the printing speed is too fast, a tensile force will be generated in a printed line so as to cause the fracture of the line, and a phenomenon that an extruded material before completely bonded to a printing platform or printed parts will move with the movement of the nozzle will occur, which significantly affects the printing accuracy. When the printing speed is too slow, extruded lines become thick, so that printed objects are wide and large, and low in accuracy. It is determined through a large number of experiments that the printing accuracy is the best when the nozzle moving speed is 10-15 mm/s.

c. determination of discharging speed: the discharging speed is linearly related to the diameter of an extruded material. A good combination of the discharging speed and the nozzle moving speed shall be provided. If the discharging speed is too fast, and the nozzle moving speed is less than the discharging speed, a situation that a printed object is wider and larger than a target object will occur; and if the discharging speed is too slow, and the nozzle moving speed is greater than the discharging speed, a situation that the extruded material suffers from line fracture will occur. Thus, it is determined through researches that the optimal discharging speed is 20-22 $mm^3/s$.

In the step (1), the time of soaking is 12 h.

In the step (3), the amount of the white granulated sugar added is 30-40% by mass of the white kidney bean paste.

In the step (3), after the white bean paste is cooled to room temperature, in percentage by mass, the amounts of the butter, the fine granulated sugar and the whipped cream added are respectively 15-20%, 10-12% and 10-15%.

In the step (6), the added crushed rose flowers are one or at least two of the items a, b, and c mentioned in the step (5).

In the step (7), the printing accuracy of a product can reach 95% or more.

Advantageous Effects

According to the present invention, rose flower materials in a certain shape are applied to an extrusion-based 3D food printer for the first time, which provides a certain theoretical basis for the printing of granular or irregular-shaped materials in the future. The main material for printing used in the present invention is white bean paste, which can be used as a dessert or a snack for catering cold dishes.

DESCRIPTION OF THE EMBODIMENTS

A further explanation of the technical solution of the present invention will be made below in connection with specific examples of the present invention.

Example 1: precision 3D printing of non-homogeneous recombinant products by adding crushed rose flowers having the width and length of less than 0.2 cm in addition amount of 1%.

First, white kidney beans were washed and soaked for 12 h, and then peeled and boiled for 40 min until the white kidney beans were softened; then the obtained beans were beaten for three times by using a beating machine so as to obtain a delicate paste. Based on white kidney beans having undergone beating, 30% of white sugar was added, the two were uniformly mixed, the obtained mixture was simmered slowly over a low heat until the white bean paste was viscous, and when the bean paste could be in the shape of an inverted triangle while being lifted up by using a scraper, the heating was stopped. Based on the white bean paste cooled to room temperature, 20% of butter and 10% of fine granulated sugar were added, then 12% of whipped cream was added in batches, and then the obtained mixture was beaten. Crushed rose flowers with a width and length of less than 0.2 cm and having undergone surface oil treatment were added in the addition amount of 1%, so that a better taste would be given to the white bean paste by means of the special flavor of the rose flowers. Under the conditions that the nozzle diameter was 1.2 mm, the printing temperature was 25° C., the nozzle moving speed was 15 mm/s, and the discharging speed was 22 mm³/s, the accuracy of a printed object could reach 95%, and the structure of the printed object did not collapse within 40 min after being printed.

Example 2: precision 3D printing of non-homogeneous recombinant products by adding crushed rose flowers having the width and length of 0.2-0.5 cm in addition amount of 1%

First, white kidney beans were washed and soaked for 12 h, and then peeled and boiled for 40 min until the white kidney beans were softened; then the obtained beans were beaten for three times by using a beating machine so as to obtain a delicate paste. Based on white kidney beans having undergone beating, 30% of white granulated sugar was added, the two were uniformly mixed, the obtained mixture was simmered slowly over a low heat until the white bean paste was viscous, and when the bean paste could be in the shape of an inverted triangle while being lifted up by using a scraper, the heating was stopped. Based on the white bean paste cooled to room temperature, 20% of butter and 10% of fine granulated sugar were added, then 15% of whipped cream was added in batches, and then the obtained mixture was beaten. Crushed rose flowers with a width and length of 0.2-0.5 cm and having undergone surface oil treatment were added in the addition amount of 1%, so that a better taste would be given to the white bean paste by means of the special flavor of the rose flowers. Under the conditions that the nozzle diameter was 1.2 mm, the printing temperature was 25° C., the nozzle moving speed was 13 mm/s, and the discharging speed was 22 mm³/s, the accuracy of a printed object could reach 95%, and the structure of the printed object did not collapse within 40 min after being printed.

What is claimed is:

1. A single nozzle 3D printing method for non-homogeneous recombinant food containing crushed rose flowers, comprising the following specific steps:
   step (1) pre-processing of white kidney beans: the white kidney beans are washed, soaked in cold water, and then peeled, and the peeled white kidney beans are boiled for 40 min until the white kidney beans are softened;
   step (2) beating: the white kidney beans boiled in the step (1) are beaten until a delicate paste is obtained;
   step (3) preparation of white bean paste: the white kidney bean paste obtained in the step (2) is mixed with white granulated sugar, the obtained mixture is simmered slowly over a low heat until the white bean paste is viscous, and in the shape of an inverted triangle while being lifted up by using a scraper, and the white bean paste is allowed to cool to room temperature, and then butter, fine granulated sugar, and whipped cream are added thereto and beaten;
   step (4) preparation of an aqueous solution of edible glycerin: 20 ml of edible glycerin is mixed with 100 ml of water so as to prepare a 20% aqueous glycerin solution, which is stored in a 4° C. refrigerator;
   step (5) pre-processing of crushed rose flowers: complete rose flower petals are processed into the following at least one of three sizes:
   item a. 0.5-1.2 cm in length and 0.5-1.2 cm in width;
   item b. 0.2-0.5 cm in length and 0.2-0.5 cm in width; and
   item c. less than 0.2 cm in length and less than 0.2 cm in width; and
   the processed crushed rose flowers are soaked in the aqueous solution of edible glycerin prepared in advance in the step (4) for 30 min;
   step (6) addition of crushed rose flowers: after the white bean paste obtained in the step (3) is cooled to room temperature, the crushed rose flowers soaked in the step (5) are added thereto so as to obtain a mixed material of the bean paste and the crushed rose flowers, where the amount of the crushed rose flowers added is 1-3% by mass of the white bean paste obtained in the step (3); and
   step (7) 3D printing: 3D printing is performed on the mixed material of the bean paste and the crushed rose flowers obtained in the step (6), where the printing temperature is 25° C., the nozzle diameter is 1.2 mm, the nozzle moving speed is 10-15 mm/s, and the discharging speed is 20-22 mm³/s.

2. The method according to claim 1, wherein in the step (1), the time of soaking is 12h.

3. The method according to claim 1, wherein in the step (3), the amount of the white granulated sugar added is 30-40% by mass of the white kidney bean paste.

4. The method according to claim 1, wherein in the step (3), the amounts of the butter, the fine granulated sugar, and the whipped cream added after the white bean paste is cooled to room temperature are respectively 15-20%, 10-12% and 10-15% in percentage by mass of the white kidney bean paste.

5. The method according to claim 3, wherein in the step (3), the amounts of the butter, the fine granulated sugar, and the whipped cream added after the white bean paste is cooled to room temperature are respectively 15-20%, 10-12% and 10-15% in percentage by mass of the white kidney bean paste.

6. The method according to claim 1, wherein a printing accuracy of the 3D printing reaches 95% or more.

7. The method according to claim 2, wherein in the step (3), the amount of the white granulated sugar added is 30-40% by mass of the white kidney bean paste.

8. The method according to claim 2, wherein in the step (3), the amounts of the butter, the fine granulated sugar, and the whipped cream added after the white bean paste is cooled to room temperature are respectively 15-20%, 10-12% and 10-15% in percentage by mass of the white kidney bean paste.

9. The method according to claim 2, wherein a printing accuracy of the 3D printing reaches 95% or more.

10. The method according to claim 5, wherein a printing accuracy of the 3D printing reaches 95% or more.

* * * * *